US006005979A

United States Patent [19]

Chang et al.

[11] Patent Number: 6,005,979

[45] Date of Patent: Dec. 21, 1999

[54] SYSTEM OF DATA COMPRESSION BY SUBSAMPLING, AND PREFERABLY ADAPTIVE TRIM ACCOUNTING, FOR SENDING IMAGES TO A PRINTER

[75] Inventors: Michael M. Chang, San Diego, Calif.; Jeff W. Strain, Austin, Tex.

[73] Assignee: Hewlett-Packard Co., Palo Alto, Calif.

[21] Appl. No.: 08/783,394

[22] Filed: Jan. 13, 1997

[51] Int. Cl.[6] ................................ G06K 9/36; G06K 9/46

[52] U.S. Cl. ........................... 382/232; 382/245; 382/300

[58] Field of Search .................................... 382/176, 232, 382/238, 240, 245, 251, 299, 300; 348/387, 390, 394, 400, 409; 358/426, 261.1, 261.2, 428; 395/114

[56] References Cited

U.S. PATENT DOCUMENTS

| | | | |
|---|---|---|---|
| 5,598,214 | 1/1997 | Kondo et al. | 348/414 |
| 5,696,842 | 12/1997 | Shirasawa et al. | 382/176 |
| 5,703,965 | 12/1997 | Fu et al. | 382/232 |

*Primary Examiner*—Phuoc Tran

[57] ABSTRACT

Pixel-based image data are subsampled for transmission to a printer and later bilinear interpolation in the printer. The transmission system evaluates the error that will remain after interpolation. In response to this evaluation, the transmission system also forms trim data for later application to the interpolated subsample to remove a significant part of the error. Preferably trim data points are selected based on relative importance of the associated correction—specifically, size of the error that will remain after interpolation—but also the amount of trim data is controlled to maintain a significant advantage in overall transmission time, relative to transmitting the entire image-data set. The amount of trim data is held roughly to a certain fraction, about five percent, of the number of points in each data block (e. g., swath), essentially independent of the error evaluation. Preferably this controlled amount of trim data is padded out with zeroes to form a complete trim-data array—which is then run-length encoded. The encoded trim data and the subsample are sent to the printer. (Preferably pure-text portions are sent separately.) The printer applies the trim data to the interpolated subsample to obtain a better approximation to the original image data.

15 Claims, 9 Drawing Sheets

| ERROR MAGNITUDE | # OF OCCURRANCES | % OF TOTAL | RUNNING % OF TOTAL | RLE ERROR SIZE | COMPRESS RATIO | | | | |
|---|---|---|---|---|---|---|---|---|---|
| 0 | 2052634 | 19.04% | 19.04% | | | | | | |
| 1 | 3221007 | 29.88% | 48.92% | | | | | | |
| 2 | 1878780 | 17.43% | 66.35% | | | | | | |
| 3 | 998917 | 9.27% | 75.62% | | | | | | |
| 4 | 541725 | 5.03% | 80.64% | | | | | | |
| 5 | 331278 | 3.07% | 83.72% | | | | | | |
| 6 | 232738 | 2.16% | 85.88% | | | | | | |
| 7 | 180917 | 1.68% | 87.55% | | | | | | |
| 8 | 149805 | 1.39% | 88.94% | | | | | | |
| 9 | 127684 | 1.18% | 90.13% | | | | | | |
| 10 | 110396 | 1.02% | 91.15% | | | | | | |
| 11 | 95227 | 0.88% | 92.04% | | | | | | |
| 12 | 85127 | 0.79% | 92.83% | | | | | | |
| 13 | 76965 | 0.71% | 93.54% | | | | | | |
| 14 | 69690 | 0.65% | 94.19% | 1337731 | 2.92 | | | | |
| 15 | 63544 | 0.59% | 94.78% | | | | | | |
| 16 | 56986 | 0.53% | 95.30% | | | | FILE SIZE | 14377308 | |
| 17 | 51935 | 0.48% | 95.79% | | | | RDX SIZE | 3594327 | |
| 18 | 47176 | 0.44% | 96.22% | | | | ERR SIZE | 10782981 | |

| | | | | | | | | | |
|---|---|---|---|---|---|---|---|---|---|
| 19 | 43332 | 0.40% | 96.63% | | | | | | |
| 20 | 39557 | 0.37% | 96.99% | | | | | | |
| 21 | 35058 | 0.33% | 97.32% | | | | | | |
| 22 | 31017 | 0.29% | 97.61% | | | | | | |
| 23 | 27543 | 0.26% | 97.86% | | | | | | |
| 24 | 24057 | 0.22% | 98.08% | | | | | | |
| 25 | 20024 | 0.19% | 98.27% | | | | | | |
| 26 | 17229 | 0.16% | 98.43% | | | | | | |
| 27 | 14726 | 0.14% | 98.57% | | | | | | |
| 28 | 13287 | 0.12% | 98.69% | | | | | | |
| 29 | 11370 | 0.11% | 98.79% | | | | | | |
| 30 | 10286 | 0.10% | 98.89% | | | | | | |
| 31 | 9120 | 0.08% | 98.97% | | | | | | |
| 32 | 8152 | 0.08% | 99.05% | | | | | | |
| 33 | 7462 | 0.07% | 99.12% | | | | | | |
| 34 | 7012 | 0.07% | 99.18% | | | | | | |
| 35 | 6458 | | | | | | | | |

FIG.4a-2

| ERROR MAGNITUDE | # OF OCCURRANCES | % OF TOTAL | RUNNING % OF TOTAL | RLE ERROR SIZE | COMPRESS RATIO | | | | |
|---|---|---|---|---|---|---|---|---|---|
| 0 | 895484 | 8.24% | 8.24% | | | | | | |
| 1 | 1607231 | 14.78% | 23.02% | | | | | | |
| 2 | 1262020 | 11.61% | 34.63% | | | | | | |
| 3 | 974149 | 8.96% | 43.59% | | | | | | |
| 4 | 758148 | 6.97% | 50.56% | | | | | | |
| 5 | 602417 | 5.54% | 56.10% | | | | | | |
| 6 | 496760 | 4.57% | 60.67% | | | | | | |
| 7 | 418442 | 3.85% | 64.52% | | | | | | |
| 8 | 359484 | 3.31% | 67.82% | | | | | | |
| 9 | 313719 | 2.89% | 70.71% | | | | | | |
| 10 | 276218 | 2.54% | 73.25% | | | | | | |
| 11 | 245336 | 2.26% | 75.51% | | | | | | |
| 12 | 218767 | 2.01% | 77.52% | | | | | | |
| 13 | 196706 | 1.81% | 79.33% | | | | | | |
| 14 | 177145 | 1.63% | 80.96% | 3410807 | 2.06 | | | | |
| 15 | 160817 | 1.48% | 82.43% | | | | | | |
| 16 | 147639 | 1.36% | 83.79% | | | | FILE SIZE | 14501352 | |
| 17 | 135401 | 1.25% | 85.04% | | | | RDX SIZE | 3625338 | |
| 18 | 124750 | 1.15% | 86.19% | | | | ERR SIZE | 10876014 | |

| | | | | | | | | | |
|---|---|---|---|---|---|---|---|---|---|
| 19 | 115475 | 1.06% | 87.25% | | | | | | |
| 20 | 106574 | 0.98% | 88.23% | | | | | | |
| 21 | 98405 | 0.91% | 89.13% | | | | | | |
| 22 | 91108 | 0.84% | 89.97% | | | | | | |
| 23 | 85022 | 0.78% | 90.75% | | | | | | |
| 24 | 78416 | 0.72% | 91.47% | | | | | | |
| 25 | 72653 | 0.67% | 92.14% | | | | | | |
| 26 | 67016 | 0.62% | 92.76% | | | | | | |
| 27 | 62114 | 0.57% | 93.33% | | | | | | |
| 28 | 57951 | 0.53% | 93.86% | | | | | | |
| 29 | 53551 | 0.49% | 94.36% | 1268416 | 2.96 | | | | |
| 30 | 49209 | 0.45% | 94.81% | | | | | | |
| 31 | 45539 | 0.42% | 95.23% | | | | | | |
| 32 | 42269 | 0.39% | 95.62% | | | | | | |
| 33 | 38717 | 0.36% | 95.97% | | | | | | |
| 34 | 36013 | 0.33% | 96.30% | | | | | | |
| 35 | 33564 | 0.31% | 96.61% | | | | | | |

FIG.4b-2

| ERROR MAGNITUDE | # OF OCCURRANCES | % OF TOTAL | RUNNING % OF TOTAL | RLE ERROR SIZE | COMPRESS RATIO | | | | |
|---|---|---|---|---|---|---|---|---|---|
| 0 | 11164125 | 75.17% | 75.17% | | | | | | |
| 1 | 875583 | 5.90% | 81.07% | | | | | | |
| 2 | 622525 | 4.19% | 85.26% | | | | | | |
| 3 | 417284 | 2.81% | 88.07% | | | | | | |
| 4 | 281484 | 1.90% | 89.96% | | | | | | |
| 5 | 173482 | 1.17% | 91.13% | | | | | | |
| 6 | 118417 | 0.80% | 91.93% | | | | | | |
| 7 | 114121 | 0.77% | 92.70% | | | | | | |
| 8 | 120714 | 0.81% | 93.51% | | | | | | |
| 9 | 48297 | 0.33% | 93.83% | | | | | | |
| 10 | 37354 | 0.25% | 94.09% | | | | | | |
| 11 | 33244 | 0.22% | 94.31% | | | | | | |
| 12 | 26400 | 0.18% | 94.49% | | | | | | |
| 13 | 18950 | 0.13% | 94.61% | | | | | | |
| 14 | 15914 | 0.11% | 94.72% | 1275275 | 3.18 | | | | |
| 15 | 14880 | 0.10% | 94.82% | | | | | | |
| 16 | 45493 | 0.31% | 95.13% | | | | FILE SIZE | 19887692 | |
| 17 | 10752 | 0.07% | 95.20% | | | | RDX SIZE | 4971923 | |
| 18 | 8842 | 0.06% | 95.26% | | | | ERR SIZE | 14915769 | |

| | | | | | | | | | |
|---|---|---|---|---|---|---|---|---|---|
| 19 | 5133 | 0.03% | 95.29% | | | | | | |
| 20 | 6477 | 0.04% | 95.34% | | | | | | |
| 21 | 6362 | 0.04% | 95.38% | | | | | | |
| 22 | 8440 | 0.06% | 95.44% | | | | | | |
| 23 | 18886 | 0.13% | 95.57% | | | | | | |
| 24 | 56530 | 0.38% | 95.95% | | | | | | |
| 25 | 1724 | 0.01% | 95.96% | | | | | | |
| 26 | 1643 | 0.01% | 95.97% | | | | | | |
| 27 | 1895 | 0.01% | 95.98% | | | | | | |
| 28 | 7932 | 0.05% | 96.03% | | | | | | |
| 29 | 8732 | 0.06% | 96.09% | | | | | | |
| 30 | 685 | 0.00% | 96.10% | | | | | | |
| 31 | 38123 | 0.26% | 96.35% | | | | | | |
| 32 | 103582 | 0.70% | 97.05% | | | | | | |
| 33 | 2165 | 0.01% | 97.07% | | | | | | |
| 34 | 4363 | 0.03% | 97.10% | | | | | | |
| 35 | 4090 | | | | | | | | |

FIG.4c-2

SYSTEM OF DATA COMPRESSION BY SUBSAMPLING, AND PREFERABLY ADAPTIVE TRIM ACCOUNTING, FOR SENDING IMAGES TO A PRINTER

RELATED PATENT DOCUMENT

A related document is U.S. utility-patent application Ser. No. 08/644,808 filed in the United States Patent and Trademark Office on May 10, 1996, in the name of Jae Noh. It is hereby incorporated by reference in its entirety into this document. That document deals with methods for recognizing and visually enhancing text within an image that is being read in for printing.

FIELD OF THE INVENTION

This invention relates generally to machines and procedures for printing color pictures, graphics or text, or combinations of these, on printing media such as paper, transparency stock, or other glossy media; and more particularly to apparatus and method that construct such images from individual ink spots created on a printing medium, in a two-dimensional pixel array which is derived from an image-data array developed in a host computer.

BACKGROUND OF THE INVENTION

The invention is of particular use in such apparatus and method that aim for high fidelity in reproduction of colors and fine image details. Such approaches strive for near-photographic quality, by maintaining multilevel digital representation of the visual elements all the way to the final processes in the printer.

(a) Colorimetric dynamic range—Some such systems and techniques may transmit to a printer multilevel red, green and blue (RGB) colored-light data representing each pixel of an original image, for processing (usually called "rendition") within the printer in preparation for either binary or multilevel color printing and by any one of a variety of approaches. For instance each of the three colors might be represented on an eight-bit digital scale, 256 levels (starting with zero) for each color, coming to a total of twenty-four bits at each pixel. This is the arrangement which we currently prefer.

Other such systems and techniques might entail transmission of multilevel data for three chromatic colorants customarily cyan, magenta and yellow plus black (CMYK), at each pixel—each of the four colors being represented on a six-bit digital scale, sixty-four levels for each color, again coming to twenty-four bits at each pixel. In this case, whatever rendition is desired may be performed before transmission of data to the printer, and the data which are transmitted are considered essentially ready to apply in the actual printing process. Techniques of this type, while we do not currently prefer them, can be practical and are within the scope of the present invention.

In conjunction with multiple data levels, such modern environments in computer-controlled printers typically use very high spatial resolution, for instance twelve to twenty-four pixels per millimeter (300 to 600 pixels per inch). Thus in both the colorimetric and spatial domains these printing environments effectively approach the capabilities of the photographic process.

For purposes of discussion we shall use the lower of these two resolution levels just mentioned. The data density corresponding to such performance, for a standardsize sheet of printing medium, taking the pictorial image area as about 203 by 254 millimeters (eight by ten inches), comes to about $24 \times 12^2 \times 203 \times 254$ (or $24 \times 300^2 \times 8 \times 10$)=about 173 million bits.

(b) Data transmission rates and times—Another part of the printing environments under discussion, however, is the data source: most commonly a personal computer, and nowadays one operating with the currently popular Windows® operating system. In the versions of that operating system that are now in greatest use, the average parallel data throughput to a printer is roughly 30 thousand Bytes per second (each Byte being eight bits), or 0.24 million bits per second, coming to some 15 million bits per minute.

Such printing environments tend to severely limit the overall printing throughput. Transmitting a full image on the basis of these figures requires 173–15=11½ minutes.

In the highly competitive modern world of computer-controlled high-quality color printing, even for a relatively economical printer in the range of perhaps $400 to $600, this would be unacceptably slow. The desired or acceptable page-throughput range, depending upon price and application, may be from perhaps one to five minutes—thus calling for improvement by a factor of some 2¼ to 11½.

In one current product development of the Hewlett Packard Company, a design objective is four-minute page throughput—requiring an improvement by a factor of about three. As more users turn to faster operating systems such as Windows 95® and Windows®, typical transmission speeds may rise, but probably not as rapidly as will consumer expectations for throughput. A likely result will be a commercial requirement for improvement by factors exceeding three.

(c) Data compression—A well-known way to reduce data transmission times is to somehow encode the data to lower the amount of data bits actually passing from one apparatus to another. Among the most common methods is run-length encoding (RLE), which transmits the number of like characters in an uninterrupted row (or "run") and identifies the particular character which is subject to that run.

In a typically complex pictorial image, the number of characters in a run may sometimes be great enough to produce a compression factor exceeding two, but cannot be relied upon to produce such an improvement. Whatever technique is used to garner an improvement must be reasonably reliable, consistent, so that the throughput can be stated and advertised.

Among other algorithm types currently available for image data are those known as JPEG, chrominance subsampling, Huffman encoding, and Lempel-Ziv-Welch (LZW) compression. Of these, the more simple types cannot reliably produce the needed factors of improvement.

The others require relatively complicated processing, which in turn is inconsistent with the economical selling-price range mentioned above. In the JPEG method, for example, frequency content of the data are analyzed; while not as costly as full Fourier analysis, this method is still too expensive.

Chrominance subsampling requires computations in the chroma domain—and for this purpose light signals (RGB) or colorant signals (CMYK) must be first converted to some variable related to chroma. This is a relatively costly and time-consuming proposition.

Huffman encoding is described by W. Pennebaker and J. Mitchell in their book *JPEG Still Image Data Compression Standard*, as follows. The Huffman technique belongs to the class of entropy coding and involves statistical analysis. For a set of symbols to be coded, the most probable one will have the shortest code, and the least likely will have the longest. Here is an example:

| weather | simple | probability | better |
|---|---|---|---|
| clear | 00 | 3/4 | 0 |
| cloudy | 01 | 1/8 | 10 |
| rain | 10 | 1/16 | 110 |
| snow | 11 | 1/16 | 111. |

The code used in the "simple" column has two bits per possibility, independent of the likelihood of having to use the code. The "better" column transmits a single bit for the eventuality that occurs in the great majority of cases (preferably a zero for optimum use of RLE encoding and for discrimination against all the other codes, that begin with "1"), and resorts to longer coding only for occasions that arise less frequently.

The resulting number of bits per symbol, on the average, is only $\frac{3}{4}\times1+\frac{1}{8}\times2+2\times\frac{1}{16}\times3=1\frac{3}{8}$—which is an improvement of about thirty percent, relative to two bits for the column headed "simple". The computational overhead of such a system for our present purposes, however, would be unacceptable.

LZW belongs to the category of so-called "dictionary schemes". It works by building a dictionary of symbols as the date are being treated. With a long enough data set, a good dictionary-building scheme, and long repetitive symbols, this type of approach works well—mainly due to the fact that sending the reference location of a symbol in the dictionary is more efficient than sending the symbol itself. The patented Welch form of this method is widely used.

Both the Huffman and LZW methods are classed as "lossless". It has been shown that lossless compression methods when applied to natural images usually can achieve only ratios of 1.5:1 to 2:1. Examples can be seen in Weinberger et al., "LOCO-I: a Low Complexity Lossless Image Compression Method", ISO/IEC JTC 1, SC 29, WG1, document N203 (Jul. 10, 1995).

More to the present point, LZW methods—like Huffman's—entail substantial algorithmic overhead for building of the dictionary. LZW may also be awkward to implement in real time, or without using large amounts of upstream storage capability.

Most image-compression algorithms attempt to solve the problem of data-array size, whereas the problem at hand really is one of transmission time. As suggested in the preceding paragraphs, algorithmic complexity may influence cost and also may itself constrain transmission time: computation time for compression and decompression stages is a factor in overall throughput.

Compression typically is performed in an already-existing relatively fast computing environment, at a point in the overall system that is typically shared with many other computing processes. Therefore the overall result may not be extremely sensitive to complexity in the compression stage.

Decompression, however, must occur in the printer. Here, designing in a requirement for rapid complex computation, at a point which is dedicated to the printer itself, translates into prohibitive cost.

Additionally, the "photographic" quality output of the current generation of color printer products demands that any image manipulation be visually lossless. This consideration militates against some of the familiar techniques for data compression, which sometimes tend to create perceptible shifts in visual quality.

(d) Conclusion—The above-discussed limitations on data transfer, in relation to the size of modern data files for direction to computer-controlled modern printers, have continued to impede achievement of uniformly excellent inkjet printing—at high throughput. Thus important aspects of the technology used in the field of the invention remain amenable to useful refinement.

SUMMARY OF THE DISCLOSURE

The present invention introduces such refinement. A satisfactory solution requires a careful balance between algorithmic complexity and compression efficiency.

What complexity is permitted should be pushed into the host computer, allowing for fast and simple hardware decompression at the target—in the printer. This objective, however, must not be pursued to the point of significant adverse performance impact on the host (in other words to the point of overstaying its welcome). The present invention satisfies these constraints as well as the other considerations discussed above.

In its preferred embodiments, the present invention has several aspects or facets that can be used independently, although they are preferably employed together to optimize their benefits. With respect to a first of these principal aspects, the invention exists within a system for transferring pixel-based image data from an image-data source into a printer and for employing those data in the printer.

Most commonly such a system includes portions of a host computer, and of a printer, and of software called a "printer driver" that operates within the computer, and of hardware-embedded firmware that operates within the printer. (Other forms of implementation are within the scope of the invention.)

Thus within such a system the present inventive combination itself, as will be seen, may be part of the computer and/or printer driver; or it may be that in conjunction with part of the printer and/or firmware. These forms of the invention correspond to the first major aspect or facet discussed below.

Now in preferred embodiments of this first of its facets or aspects, the inventive combination includes some means for subsampling an entire set of image data, to form a subsample for transmission and later interpolation. For purposes of generality and breadth in discussing the invention, these means will be called simply the "subsampling means".

The combination also includes some means for evaluating error that will remain upon interpolating the subsample—i.e. a residual error, equal to the differences between the original data points and the interpolated subsample. These means, again for generality, will be called the "error-evaluating means".

Further the combination includes some means for forming trim data—again, the "trim-data forming means". The trim-data forming means are responsive to the error-evaluating means.

The trim data formed by these means are for application to the interpolated subsample, to remove a significant part of the error. In other words, the trim data refine the interpolated subsample so that the refined version is more closely related to the original data. In accordance with the invention, however, ordinarily the trim data when applied to the interpolated subsample will not remove all of the error.

The combination additionally includes some means for transmitting, to the printer, the subsample and the trim data.

The foregoing may constitute a description or definition of the first facet of the invention in its broadest or most general form. Even in this general form, however, it can be seen that this aspect of the invention significantly mitigates the difficulties left unresolved in the art.

In particular, the invention provides a family of very simple compression and decompression procedures that achieve the relatively low compression factors required, and do so with minimal processing overhead. Within this range of compression factors, the parameters of the procedure are also easily scaled to accommodate various specific constraints of throughput and image size.

Thereby, accuracy of the trim data (and so overall transmission accuracy of the link) can be selected in a generally direct relation with available throughput, or inverse relation with desired compression factor—i. e., with image size. Many strategies for constacting the trim data are possible within the scope of the invention.

Although this first aspect of the invention in its broad form thus represents a significant advance in the art, it is preferably practiced in conjunction with certain other features or characteristics that further enhance enjoyment of overall benefits. For example, it is preferred that the subsampling means subsample the entire image-data set substantially periodically within the entire set—or within defined portions of the entire set, as for instance within swaths of a scanning swath printhead.

It is also preferred that the trim-data forming means control the amount of trim data, in such a way as to maintain a significant advantage in overall transmission time of the subsample and the trim data—relative to transmitting the entire image-data set. In other words the amount of trim data is advantageously controlled dynamically, or adaptively, through calculations working backward from the desired performance.

Also preferably the trim-data forming means select trim-data points for use based upon the relative importance of the corresponding correction. In this regard we prefer, more specifically, that the trim-data forming means select trim-data points for use based upon the size of the error that will remain upon interpolating the subsample.

Still another preference is that the trim-data forming means control the amount of trim data for a data block, at a substantially constant fraction of the number of points in said data block, substantially independent of the error-evaluating means. Here we mean the phrase "data block" in a general way—to encompass either (1) the entire image-data set or (2) one of a group of defined portions of that entire image-data set.

When the trim-data forming means select data points, it is further preferred that these means further include some means for padding out the controlled amount of trim data with zeroes to form a complete trim-data array. (In one sense the array is not completely complete: we prefer not to include any zeroes or other data for those particular pixels which are in the subsample. Data for those pixels would be redundant, and the printer is easily taught to skip over those pixels when applying the trim data.) We also prefer to include further means for run-length encoding the padded-out trim-data array.

Thus the first aspect of our invention in effect transforms the data format into one which is amenable to this familiar, simple and effective RLE technique. The initial full image-array data format, as mentioned earlier, is incompatible with such handling.

Moreover in one alternative form of this first main aspect of the invention, it is preferable that the trim-data forming means control (i. e. hold) the amount of the trim data at a substantially constant fraction of the number of points in the entire image-data set, substantially independent of the error-evaluating means. (As mentioned above, the "amount of trim data" preferably excludes the omitted points for the pixels that are in the subsample.) We prefer to set that fraction to approximately five percent.

In another important alternative, or variant, we prefer that the trim-data forming means instead control the amount of trim data for defined portions of the subsample, at a substantially constant fraction of the number of points in each of the defined portions. As an example, this variant is especially useful when the invention is for use with a printer that constructs an image on a printing medium by scanning of a multielement printhead across the medium to form swaths of dots.

In this case each of the "defined portions" is advantageously a swath of dots; and the trim-data forming means control the amount of trim data for each swath at a substantially constant fraction of the number of points in the swath. In other words, if the printing system operates on a swath-wise basis it can be especially effective and simple to design the compression system to operate in the same way—compressing, transmitting, and decompressing each swath in turn, just preliminary to printing. For this paradigm too, the preferable fraction is roughly five percent.

It is also preferred that the first facet of the invention include some means for transmitting pure-text portions of an image separately from the subsample and the trim data. This preference arises from the fact that in dealing with text at certain font sizes the invention, while usable, tends to produce image quality that is slightly less than ideal.

It is also preferred that the invention include means for storage of automated instructions for operation of all of the foregoing means. Correspondingly the invention preferably includes means for retrieval of the instructions from storage and application of the retrieved instructions to operate all of those foregoing means.

It is also preferred that the inventive combination further include, in the printer, corresponding provisions for interacting with the aforementioned elements of the sending system. Such provisions are discussed below in relation to the second major aspect or facet of the invention.

In preferred embodiments of a second of its major aspects, the invention is a system for receiving and using pixel-based image data from an image-data source, in a printer. This system includes some means for receiving a subsample of an entire set of image data.

It also includes means for interpolating the subsample, to form an approximation of the entire set of image data; means for receiving trim data; and means for applying the trim data to the interpolated subsample to remove a significant part of the error.

As will now be appreciated, preferred embodiments of this second main facet of the invention also include means for applying the trimmed interpolated subsample to control printing of a corresponding image by the printer.

The foregoing may constitute a description or definition of the second facet of the invention in its broadest or most general form. Even in this general form, however, it can be seen that this aspect of the invention too significantly mitigates the difficulties left unresolved in the art.

In particular, as to this aspect of the invention we focus upon the notably simple and fast portions of the overall procedure that are left to be done by the printer firmware. The printer simply:

receives two data streams, accumulates them into two predefined data blocks, expands one by interpolation and the other by run-length decoding (RLD) so that they are both identical in size (full-size arrays) for the particular data blocks, adds the two arrays, point for point, and prints the sum array, conventionally.

Although this second aspect of the invention in its broad form thus represents a significant advance in the art, it is preferably practiced in conjunction with certain other features or characteristics that further enhance enjoyment of overall benefits.

For example, it is preferred that the system further include some means for storage of automated instructions for operation of all of the foregoing means; and corresponding means for retrieval of the instructions from storage and application of the retrieved instructions to operate all of those means.

It is also preferred that the interpolating means interpolate bilinearly. (As suggested in discussion of the first main aspect, we also prefer that the printer automatically skip past the pixels which are in the transmitted subsample, when applying the trim data. This skipping function can be accomplished in any of a great variety of ways, as will be clear to people skilled in this field.)

In a third basic aspect or facet, the invention is a method of transferring image data into a printer. This method is for printing of a corresponding image on a printing medium, by construction from individual marks formed in pixel column-and-row arrays by a scanning multiple-nozzle pen. The pen operates in conjunction with a printing-medium advance mechanism.

The method includes the steps of subsampling an entire set of the image data, to form a subsample for transmission and interpolation; and evaluating error that will remain upon interpolating the subsample. The method also includes the step of forming trim data for application to the interpolated subsample to remove a significant part of that error. This step is responsive to the error-evaluating means.

In addition the method includes the step of transmitting the subsample and the trim data from the source to the printer. Further steps of the method include storing, in machine-readable form, automated instructions for all the stated steps; and retrieving and implementing the automated instructions to compress and transmit data.

The foregoing may represent a definition or description of the third main facet of the invention in its most general or broad form. Even as thus broadly couched, this aspect of the invention can be seen to importantly advance the art of high-quality color printing. In particular the benefits discussed above in regard to the first main aspect of the invention are enjoyed here in the context of an operating method.

Nevertheless we prefer to practice this third aspect of the invention in conjunction with certain characteristics or features that optimize enjoyment of its benefits. For example it is preferred that the trim-data forming step include controlling the amount of trim data to maintain a significant advantage in overall transmission time of the subsample and the trim data, relative to transmitting the entire image-data set.

It is also preferable that the method further include—in the printer—the steps of receiving the subsample and the trim data, interpolating the subsample, applying the trim data to refine the interpolated subsample, and applying the refined interpolated subsample to control printing of the corresponding image.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. THE TRANSMISSION STAGE GENERALLY

Figure 1:
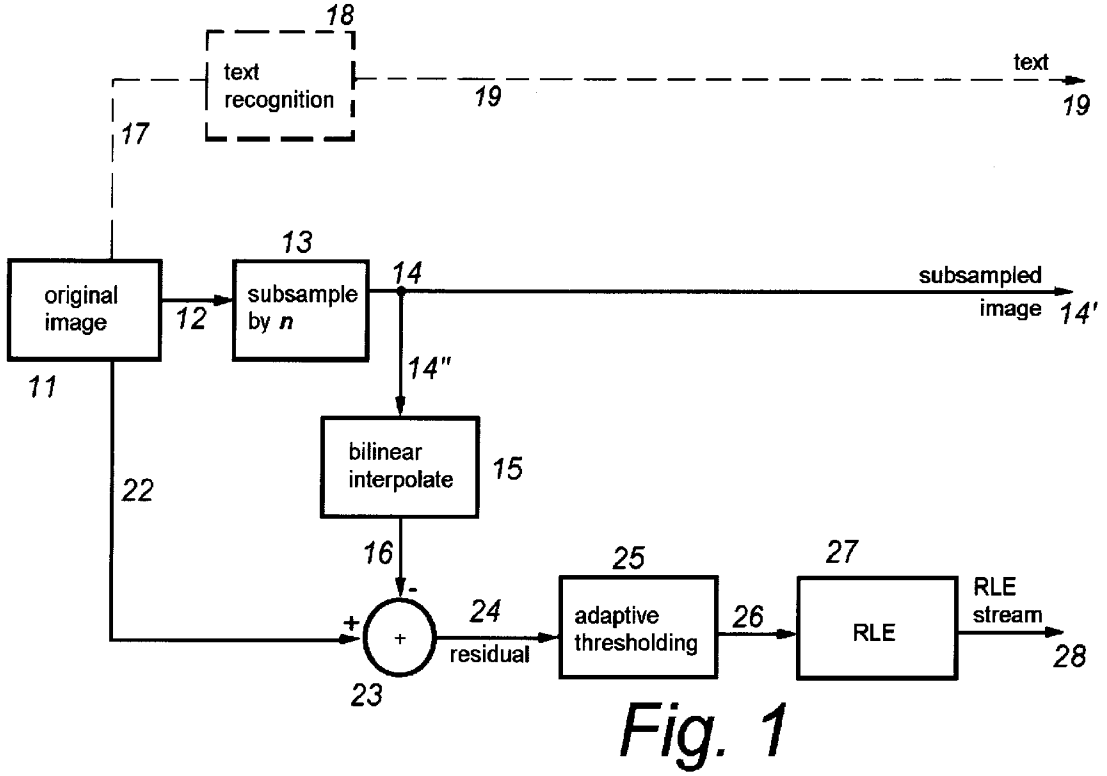
FIG. 1 is a block-diagrammatic representation of a transmission-stage system (i. e., most typically a computer with printer driver), and also of processes within that apparatus, according to the invention.

Data from the original raster image 11 (FIG. 1), for a pictorial presentation to be printed, passes along two paths 12, 22 to separate apparatus (and procedure) modules.

(a) Subsampling—One of these modules is the fundamental subsampling block 13, in which the amount of data along each direction in the data array is reduced systematically by a factor n to produce a subsample 14. As the subsampling is bilinear, by the factor n in each direction, the overall reduction in mass of data is by the factor $n^2$.

We currently prefer to use n=2, so that the total reduction in amount of data is to one-quarter of the original image-array size. With the target compression of 3:1 in mind, this figure leaves the equivalent of one-twelfth of the original array size ($1/3-1/4=1/12$) for trim data—including any necessary encoding of that data.

This smaller data array 14, too, is used in two ways. In the first, it passes entirely out of the transmission system of FIG. 1 as an output signal 14' to the printer, where it can be seen (FIG. 2) as the primary input signal.

(b) Interpolation—In the printer, this received image array 14' will be necessarily interpolated 31 to provide the full complement of data needed for printing the image. The data array 32 could be used in the printer without further processing, to print the corresponding image—but would be subject to errors.

These errors, for a typical image, would be noticeable in only a relatively small fraction of the picture—typically some five percent to at most fifteen percent of the whole image area. Nevertheless we assume that to a critical eye they would be unacceptable. A philosophy of the present invention is to try to supply to the printer, in essence, just enough information to correct those of the errors that would in fact be noticeable (or most noticeable), and to disregard the rest of the errors.

Now reverting to discussion of the transmission stage the reduced image array 14 (FIG. 1) also passes along another path 14" to a bilinear interpolation block 15. This module 15 mimics or duplicates the operation of the necessary interpolation block 31 (FIG. 2) in the receiving printer.

The resulting interpolated array 16 is substantially identical to the interpolated array 32 produced in the printer, in response to the transmitted signal 14'. This shadow interpolated array 16, in the transmission stage, will serve to (1) flag the noticeable errors mentioned above, and (2) supply data necessary to generating the correction information called for by the philosophy of the invention.

(c) Residual-error determination—For this purpose the duplicate array 16 is compared 23 with the original image, received along the second path 22 mentioned at the beginning of this discussion. The comparison module 23 operates by subtracting the duplicate interpolated array 16 from the original data received 22—or, as suggested in FIG. 1, by inverting the algebraic sign of the duplicate array 16 and then adding the inverted array 16 to the original-data information 22.

The result of this subtraction 23 is an array of "residual" errors 24—errors as between the interpolated data array 16 or 32 and the original image. In practice such errors arise whenever the assumption, e. g. of linearity, that underlies the interpolation process fails.

(In the remainder of this document we shall assume for purposes of simplicity in discussion that the interpolation processes 15, 31 performed in the transmitting and receiving stages are substantially the same—and specifically that both are linear in the two axes of a rectangular data array, as we prefer. Those skilled in the art will understand that other interpolation techniques, e. g. nonlinear, or strategically differing as between the two stages, can be substituted straightforwardly, and within the scope of the invention.)

To the extent that the behavior of the image happens to be linear in the regions which are between image points that are retained in the subsample 14, the residual 24 will always be zero and call for no correction. Of course by definition no correction is ever needed at the data points retained in the subsample 14.

(d) Downsampling the residual—Now it will be plain that the residual 24 describes the correction needed to produce a perfect image—i. e., to trim up the subsample 14, 14' to make it exactly the same as the original image 11. If all this information were transmitted to and suitably applied by the printer, however, while the resulting printed image would be "perfect" the total transmission time for these correction data alone could in principle be as long as it would have taken to simply transmit the entire original image 11.

Hence the overall result, with transmission of the entire residual array 24, would be highly counterproductive. What is needed is a strategy for intelligently selecting some subset of what is needed to product a perfect image—namely, a trim-data subset that yields an image which is perceptually indistinguishable, or nearly so, from a perfect one.

Perhaps in purest principle almost any selection criterion would be helpful. For example, if the first quarter of the residual array 24 were used and the remainder discarded, then the first quarter of the reproduced overall image would be significantly improved—so on average the overall image would be somehow better.

The resulting inconsistency and discontinuity in quality, however, might be conspicuous—and furthermore this technique is equivalent, in terms of information content, to simply transmitting the entire first quarter of the original image and then subsampling only the rest. Therefore this strategy seems less than ideal.

It may appear that a better strategy would be simply to systematically subsample the residual array, as this would at least distribute the improvement in a rational way throughout the image—but again this is informationally equivalent to merely a more-elaborate subsampling of the original image. Little or nothing is gained, and the additional computation 15, 23, 25, 27 becomes apparently only waste overhead.

What is desired is a strategy that provides correction where correction is, in some sense, most needed. The apparatus of our invention indeed does exactly this—it implements a smart algorithm which in fact intelligently selects that very subset of the residual data which makes most effective possible use of the added computational resources and transmission time.

We have already pointed out that the residual array 24 describes the correction needed to produce a perfect image. In accordance with our invention, however, we consider it useful to recognize that the information in the residual data array 24 actually can be segregated into two different types of information, and these in turn can be utilized in two different system blocks (or process stages) respectively.

(e) Using the residual itself to guide the downsampling—Thus first the magnitude of the residual 24 at each pixel is an indicator of departure from linearity, and therefore of the need for correction, at that pixel. Then secondly the magnitude and algebraic sign of the residual 24, considered together, provide a quantitative indication of the amount of correction or trimming-up that is needed at that pixel.

Our invention accordingly first provides an evaluation block 25 to assess the need for correction at each pixel, based upon the magnitude of the residual or error 24 at each pixel; and thereby selects, to be transmitted, correction information 26 only for pixels where correction is most needed. In this assessment and selection module 25, the residual 24 is simply compared with a threshold value.

(f) Candidate criteria for thresholding—As mentioned earlier, we have definite preferences concerning the manner of selecting this threshold. It is important to recognize, however, that our invention as most broadly couched encompasses a variety of different threshold selection processes or criteria.

For example, the threshold may be selected arbitrarily; or it may better be selected as a so-called "educated guess"—a number that seems, based upon personal observation and analysis of a great amount of real-world image data, to lead to ignoring inconsequential errors and correcting those that produce visually noticeable shifts in images. Such an educated guess might be made in terms of an absolute value, or in terms of a fraction of the signal values in the uninterpolated adjacent data points—or yet again in terms of more-complex functions of nearby signal values.

Our strong preference is for selection of the threshold, for each part of the image, based on a very different kind of educated guess and to accomplish a somewhat more subtle goal. Before describing that selection process and its rationale, however, to put that more-sophisticated strategy into a meaningful perspective we will first complete our discussion of the transmission and reception processes based on the simple idea that some threshold is established and applied in the evaluation module 25. (We do propose the understanding, however, that the threshold is selected so that only some rather small fraction of the residual data exceeds the threshold.)

When this is done, some subset 26 of the residualdata array 24 is defined for transmission to the printer, and for application within the printer as corrections to trim up the subsampled image 14'. All other points in the subsample 14' receive no correction, or to put it another way they receive a correction of zero magnitude.

(g) Encoding the trim data for reassembly—The nonzero corrections must be somehow identified, or in other words associated, with the image-data points to which they should be applied. One way to do this, for instance, would be to transmit a data-array location, in association with each correction value.

Since the number of nonzero corrections is preferably a small fraction of the array size (columns multiplied by rows), only a small amount of location data would have to be transmitted. Using this approach for full-image transmission, some of the address sizes could be unwieldy; it might well be satisfactory, however, for transmission of only a swath at a time—since at least the number of rows requiring identification in each transmission batch would be small.

We prefer a different way of identifying the nonzero corrections with their associated image-data points. We in effect construct a full-size array of trim data, i. e. an array roughly the same size as the original image array—but one in which all values are zero except those nonzero corrections selected by the evaluation or thesholding module 25. (We say "roughly" because, as mentioned earlier, those particular pixels which are included in the subsample are advantageously omitted from the trim data.)

This roughly-full-size array, consisting (unlike the original image array) primarily of zeroes, is then ideally suited for the previously mentioned classical run-length encoding (RLE) module 27 and for transmission to the printer as an RLE data stream 28. This encoding is rapid and inexpensive.

While the subsample 14' and RLE stream 28 are diagramed for tutorial purposes as parallel, those skilled in the art will understand that it will commonly be most expeditious to transmit these two data streams 14', 28 in some sort of sequence. We prefer to transmit an entire block (e. g., a full swath) of the subsample 14' followed by all of the corresponding RLE trim data 28; however, many variant sequences are functionally equivalent and within the scope of the invention.

2. THE RECEPTION (PRINTER) STAGE

As previously mentioned the receiver preferably performs an interpolation 31, which is assumed to be bilinear and closely matching that 15 performed in the transmitter; and the resulting image 32 could be used without further processing, to print a page. Resulting image quality would be degraded in only a relatively few, usually isolated regions.

According to our invention this degradation is removed, or very nearly so, through application of the trim data 28 received preferably as an RLE bit stream. As mentioned earlier these data may be encoded in some other way that identifies the array locations where they should be applied.

The trim data 28, however they were encoded, are now decoded correspondingly 33, to reconstitute the abbreviated residual 34 and so recover the thresholded data 26. (These data differ from the full, prethreshold residual set 24 that was subjected to thresholding 25 in the transmitting stage.)

Our preference for the use of an RLE process 27 at the transmission stage is in large part due to the extreme simplicity, economy, speed and reliability that can now be enjoyed in the decoding process 33. As can now be appreciated, our invention does indeed push the great bulk of any processing complexity into the transmission stage, performed by the host computer; yet even that degree of complexity is not so great as to significantly impair operation or throughput at the host. In particular generating the trim data stream 28 (apart from the subsampling process 13) requires only a single pass through the original data 11.

The thresholded trim data 26, 34 which are thus recovered are primarily zeroes, with some fraction of nonzero correction values. (As a practical matter these are well under half, as will be seen. All those values which correspond to positions within the subsample 14' are zero by definition, and so omitted from the trim data as mentioned previously.)

Next the printer applies these trim data 34 to the interpolated subsample 32, by simple addition 35, to produce a significantly closer approximation 36 to the original image 11. Although labeled "reconstructed image" in FIG. 2, the reconstruction is not perfect and this image is "reconstructed" only to the extent that earlier, in the threshold process 25, none of the discarded correction points were in fact significant.

Figure 2:
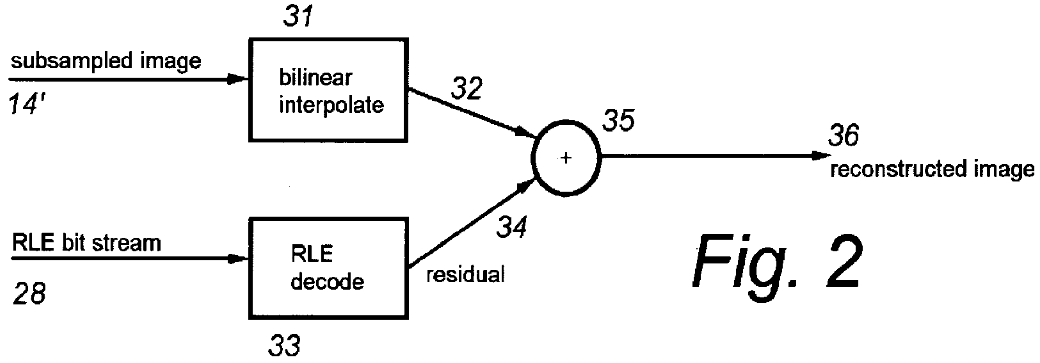
FIG. 2 is a like representation of a receiving-stage system, i. e. printer, and also of the processes which the printer performs.

The point labeled "reconstructed image" in FIG. 2 also represents final processing hardware (and associated firmware) 36 which does color correction if necessary, then preprinting rendition, and actual printing. In other words, just as FIG. 1 represents the host computer and its apparatus modules that perform the indicated steps, as mentioned in the preceding section of this document FIG. 2 represents the entire printer with its mechanical, fluidic and associated control modules 36—i. e., printing heads, scanning apparatus, printing-medium advance subsystem, input and output trays for the printing medium, etc.

To implement the decoder in the printer hardware imposes significant memory constraints. In fact, for our preferred printing environment of a swath-scanning printer (for instance a thermal-inkjet printer), the printer itself is designed to handle image data on a per-swath basis—i. e., based on the amount of data that fills a space on the printing medium which is the full width of the image and the height of the printhead. (In the case of overlapping swaths, as for instance the use of three passes to complete inking of any given shallow strip across the printing medium, the reference here should be understood to mean the amount of data that can be printed in one pass.)

In a representative device this height is equivalent to sixty-four image lines, but can be higher (for example one hundred lines) or lower. Therefore, instead of storing the complete subsample 14 and the complete residual 24, and performing the decoding on the complete image, we prefer to optimize the implementation by operating the compression algorithm on one swath at a time—meaning, typically, the amount of data printed in a single pass of the printhead, even though swaths may overlap.

Although this implementtation is dictated or at least inspired by the decoder 33, as will be seen a similar benefit is felt at the encoder 27. The following section of this document explains that threshold decisions are also made independently for each swath.

The image 36 can be printed conventionally, just as if the entire original data set 11 were present.

3. ADAPTIVE THRESHOLDING

It remains to explain our preferred choice of thresholding criteria mentioned in section 1(f) above. We have pointed out that any of a variety of criteria could effectuate major goals of our invention.

One of these is the downsampling of the residual 24 to make its transmission practical. Another is the use of the magnitude of the residual 24 at each pixel as an indicator of departure from linearity, and therefore of the need for correction, at that pixel.

Our invention, however, is best practiced to optimize still another objective. In particular we have in mind the objective of ensuring an approximately constant page throughput, particularly in view of—as an example—a current-day data-transfer rate that is roughly one-third of what is needed to transfer an entire image in a commercially acceptable product.

Thus we wish to transfer enough information to print a perceptually accurate image, but take only about onethird of the time that would be needed to actually transmit the whole image to the printer. As will be understood from the earlier "BACKGROUND" section of this document, the figure "one-third" is a strong current preference derived from modern operating enviroments, but in the larger sense is merely exemplary.

From the foregoing discussion it can be seen that we do not have enough time to transmit to the printer even half the original data, or indeed even one-third. If we took the time to transmit a third of the original data there would be no time left for transmitting the trim data 26, 28.

Moreover, as to selection of a threshold, we wish to go further than simple selection of a threshold level that will reliably be high enough to guarantee a small enough amount of nonzero data to ensure our target (for example 3:1) overall compression. In addition we wish to be certain that we do not use a threshold that is too high, or an amount of nonzero data that is too small—since such usages unnecessarily compromise the quality of the eventual output image. In other words, the objective here is to select a threshold that is just high enough to yield a quantity of nonzero data that is just small enough to produce the target compression ratio and transmission time.

Unfortunately, no single threshold value can produce these results for all or even most images. The required threshold for such idealized results will depend upon the details of data within each image. For each image, a different threshold is ideal.

Our invention therefore preferably performs calculations working backward from the target compression ratio to find a threshold that will just produce, or very nearly so, the target ratio. These calculations require a known relationship between the threshold and the resulting numbers of nonzero values in the RLE stream (or equivalently the number of locations that must be addressed), and thus the overall length of the RLE stream.

We have been unable to find such a relationship that is a priori—in other words, one that can be derived or found from first principles. Therefore we resort to an empirical relationship found from a large number of representative images.

Figures 1, 4A:
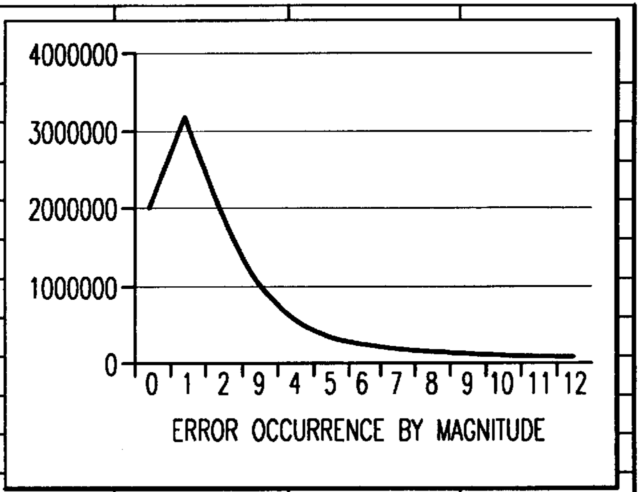
FIGS. 4*a* through 4*c* are histograms and corresponding graphs of various error levels occurring in three representative stock photos.
Figures 1, 4B:
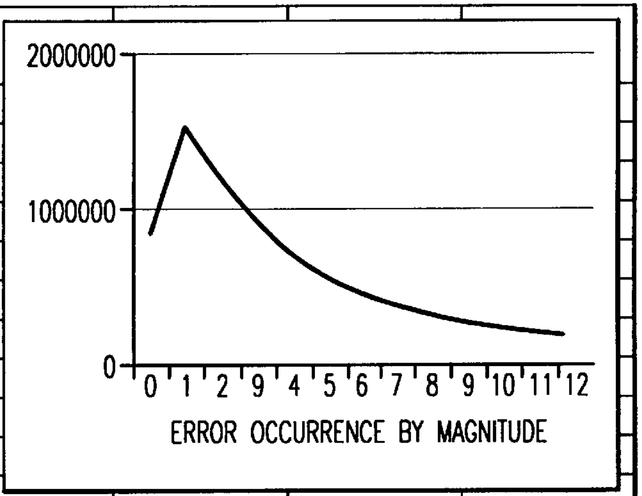
Figures 1, 4C:
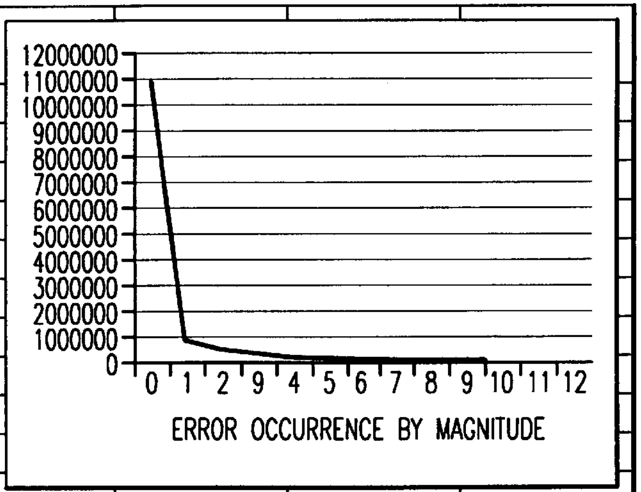

Nowadays such images can be obtained, for instance, as stock photos in CD-ROM catalogues. In FIGS. 4*a* through 4*c* are data representative of a very great many such analyses which we have conducted on realistic image data, forming the basis of the empirical relation just mentioned—and advantageously incorporated into the practice of our invention.

We have demonstrated validity of this relationship not only for an image-data block size equal to a full image but also, relative to a swath-scanning printer, within the data block size of a representative swath—as, for instance, the sixty-four lines of our currently preferred scanning thermal-inkjet printing environment.

Our research has shown that the amount of interpolation error in a bilinear subsample with n-fold reduction along each axis of the array is typically quite small. The use of about five-percent nonzero trim data turns out happily to handle very effectively—in the great majority of cases—the data points at which interpolation error is significant. (In stating this value, we take into account the reduction in trim data that is obtained simply by omitting trim data for pixels that are in the subsample.)

As can now be appreciated, the reception-stage operation is entirely independent (except for its numerical results) of the particular type of thresholding module 25 that is employed in transmission. In other words, the printer processing (FIG. 2) will proceed through all the same steps whether the threshold used in transmission is selected arbitrarily, or based on one or another educated guess, or based on the adaptive or dynamic technique just described.

This fact—that the decoder 33 is not required to have any knowledge of the thresholding scheme—makes the decoding algorithm very easy to implement.

4. CASES IN WHICH THE INVENTION DOES NOT PERFORM WELL

Due to the simplicity of the subsampling algorithm used in our invention, there are some limiting cases to its performance. One such case is a checkerboard pattern—alternating pixels being zero and full intensity (i. e., for an eight-bit dynamic range, 255).

For such patterns the above-described modules that implement the algorithm (using n=2) break down, since interpolation between two zeroes always produces a large residual (namely 255) relative to the correct value of 255. Similarly, interpolation between two 255's always produces a large residual (namely −255) relative to the correct value of zero.

In consequence the thresholding effort fails to produce any selection at all (all errors are large and none are zero), and the system cannot reduce the amount of trim data below the size of the full data array. The checkerboard pattern at pixel-grid periodicity, however, is not a typical photographic image and therefore failure of the invention to deal with such a pattern is not of great concern.

Another Limiting case is black text. With its many sharp transitions, an image of black text imposes severe strain on our algorithm: since sharp transitions are degraded by subsampling and interpolation, the resulting image appears fuzzy unless the system transmits a very large amount of trim data.

Again, the system cannot produce desirable quality while operating to the design objectives stated earlier. Since substantial amounts of text are present in many images, failure of the invention to deal with text is a significant limitation.

Two solutions are available for dealing with text. A preferred tactic is provision of a separate text data path for pure text printing—even in mixed text-and-image documents. A second approach is to provide a relaxed threshold for small areas of text, such as captions and labels in otherwise pictorial images.

Both these strategies require somehow recognizing that text is present. Such recognition can be accomplished in a variety of ways, as for example the text recognition methods in the above-mentioned patent document of Jae Noh.

Thus our invention encompasses the preferred technique of operating a separate text-recognition module 18, that receives 17 and screens the original image 11, and can trigger operation of a discrete transmission path 19 for text. Being optional, this text path 17–19 is drawn in the dashed line.

In essence the text information 17, 19 bypasses the subsampling block 13 and is transmitted directly without compression—but with location information for reinsertion of the text into its proper position in the image. Here naturally some throughput is sacrificed to preserve text reproduction quality.

5. AN EXAMPLE OF DATA FLOW IN TRANSMISSION

Tracing a hypothetical small image block through the several process steps may be helpful in understanding the invention. Such an initial data array 11 appears in FIG. 3*a*, as data rows a through d, with columns a through f: thus the pixels of the first row are aa, ab, ac . . . af; and those of the second row are ba, bc . . . bf; and so on to the bottom row with pixels db . . . df.

As shown, each pixel has three associated eight-bit data values; these may be considered as corresponding to the three primary lights red, green and blue respectively. In other words each of the primaries can have any value from $2^0-1$ through $2^8-1$, which is to say 0 through 255 inclusive.

In pixel aa for example the red level is 253, the green 18 and the blue 92. At the opposite corner of the array the last pixel df has red level 119, green 40 and blue 14.

As can be seen the array has 4 rows×6 columns=24 pixels. This array 11 is to be taken as corresponding to the array 11 in FIG. 1, except that the values in this hypothetical array are not at all intended to be representative of any particular real image type; they are only arbitrarily chosen for purposes of illustrating how the processing works.

One additional row e and column g are included beyond the borders of the array 11 proper, for the purpose of definiteness in showing interpolation for the data in row e and column f. (These additional data points are provided only because the array is very small and the example would be less helpful without ability to interpolate in the last row and column.)

For n=2 the system retains data in only every other pixel, in both directions of the array—so the subsample 14 (FIG. 3*b*) has just 2 rows×3 columns=6 pixels, one quarter of the number (24) in the original image array 11. The pixels in the subsample—and the data for those pixels—are identically pixels aa, ac, ae, ca, cc, and ce. The exemplary subsample 14 here is to be taken as corresponding to the subsample 14 in FIG. 1, except of course that they are derived from the arbitrary, hypothetical original image of FIG. 3*a*.

Figure 3A:
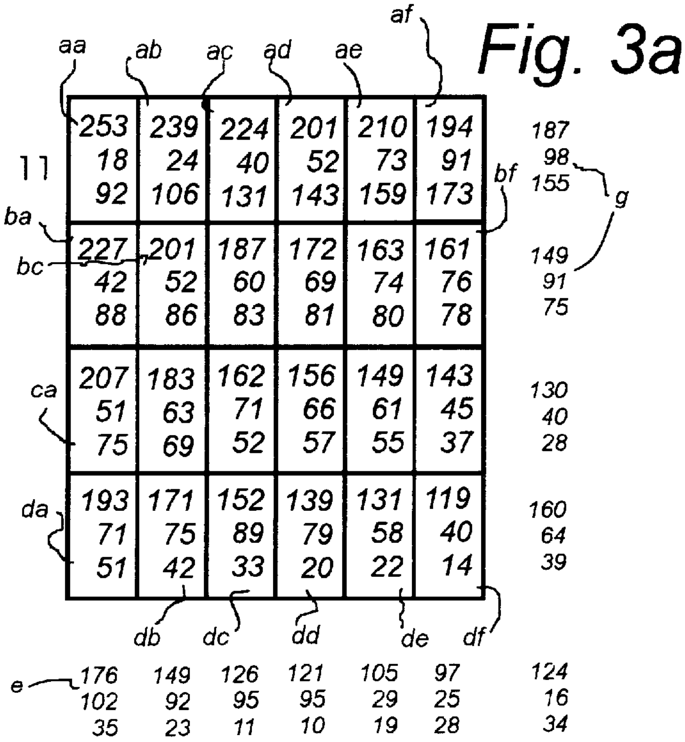
FIG. 3*a* is a hypothetical very small original image data array.
Figure 3B:
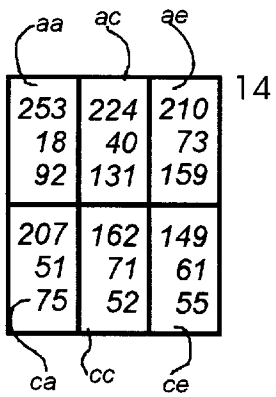
FIG. 3*b* is a subsample of the FIG. 3*a* data, for a subsampling ratio of two.
Figure 3C:
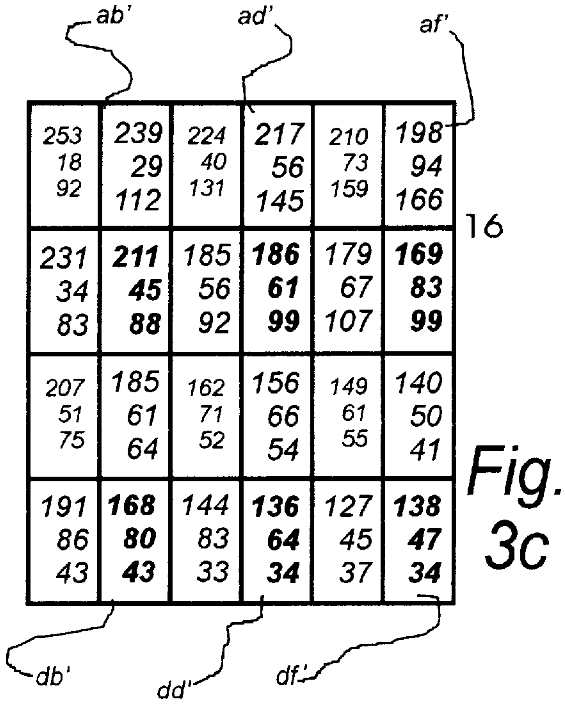
FIG. 3*c* is a data array derived by bilinear interpolation from the FIG. 3*b* subsample (with some additional assumed data at certain edges)

Next, in anticipation of an interpolation in the printer as mentioned earlier, the FIG. 3*b* data are padded out by interpolation to produce the array 16 of FIG. 3*c*. The amount of data is thus returned to the same size as the original array 11 of FIG. 3*a*.

In this step the six data points of FIG. 3*b* are retained without change. For our present tutorial purposes they are therefore somewhat less interesting than the other points in FIG. 3*c* and therefore have been shown in relatively smaller type.

The points that are new are all the other eighteen pixels in FIG. 3*c*. Those pixels in row a which are newly found by interpolation are ab', ad' and af'; and similarly the pixels in row d newly inserted by interpolation are db', d' and df'. Analogously certain pixels are added in the two intervening rows.

Pixel ab' is typical of pixels that are between two pixels of the subsample 14 (FIG. 3*b*)—along a row or a column. Each pixel in this category is calculated simply as the average of those two original pixels. In the case of ab', it is found by averaging original pixels aa and ac.

More specifically, each color value is found by averaging the corresponding two color numbers for the two horizontally or vertically adjacent pixels. That is, the red color number equals the average of the two red color numbers for the two horizontally or vertically adjacent pixels; the green number (i. e., the number for green) likewise is equal to the average of the two original green numbers; similarly for blue. In the array 16, twelve of the eighteen new pixels are filled in by this procedure.

Six of the pixels, however—those shown in boldface in FIG. 3*c*—are between original pixels only along diagonals. These must be calculated as the average of four values, namely the four that are at four corners relative to the pixel of interest.

For example pixel bb' is found by averaging original pixels aa, ac, ca and cc (or alternatively from the four two-pixel interpolations at left, right, above and below). This process may be seen as the most intensive aspect of so-called "bilinear" interpolation, i. e. interpolation along two lines at the same time to generate only a single output data point. Here too, naturally, the values for the three color primary lights are handled independently—four red numbers being averaged to obtain the interpolated red number, four green to obtain the new green number, and four blue to find the new blue.

As mentioned earlier, completion of row d and column f in FIG. 3*c* requires use of the auxiliary data provided at row e and column g in FIG. 3*a*. This is not called for along the left edge or top edge of the data block: the interpolation geometry is different. In actual practice, with much larger data blocks, edge effects are simply not very important and it is not necessary to be concerned at the asymmetry in interpolation geometry that may occur at the right edge and bottom edge of the block—or, alternatively, the asymmetry can be avoided by using an odd number of rows or columns, or both, in the data block.

Figure 3D:
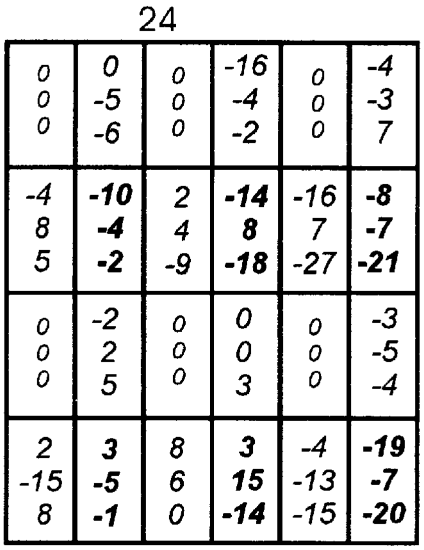
FIG. 3*d* is an error or residual array derived by comparison of FIGS. 3*a* and 3*c*.

After the system has thus filled out this bilinearly interpolated array 16, this array is compared with the original array 11 (FIG. 3*a*), by subtracting the former from the latter, to develop the residual data 24 (FIG. 3*d*). As can be seen, for example, in the upper-right-hand corner of the residual array 24, the difference datum or residual for the red light is 194−198=−4; the residual for green is 91−94=−3; and the figure for blue is 173−166=7.

Necessarily the residual for the pixels in the subsample 14 will be zero for all three color planes, as seen in FIG. 3*d* by the triplets of zeroes. These are printed in smaller type to emphasize their relationship to the original-pixel values—which are similarly printed in small type in FIG. 3*c* as mentioned above. The residual data 24 of FIG. 3*d* is to be understood as corresponding (again within the hypothetical character of the overall example) to residual 24 of FIG. 1.

Next a threshold is applied to these data, to reduce the overall number of nonzero values in the interest of transmission brevity as previously explained. At the same time we take the opportunity to remove those of the zero values that are always zero by definition—namely, the above-mentioned six triplets of zeroes that are printed in smaller type in FIG. 3*d*.

It would be pointless to transmit these eighteen values, since they would be redundant information and the receiver can simply be instructed that the values in these pixels are never modified. Accordingly these positions are all left blank in the thresholded data of FIG. 3*e*.

With this step, the number of values to be accounted for in the RLE transmission process is reduced by twenty-five percent—from seventy-two to fifty-four (18 pixels×3 numbers per pixel=54 values in the block). In accordance with the most highly preferred form of our invention, the number of nonzero values is simply reduced to a fixed fraction of that total number (fifty-four) of values in the block.

In the system of greatest current interest, that fixed fraction is about five percent. This fraction of our hypothetical data array of only fifty-four trim-data values comes to just under three numbers. In other words, about three numbers should be retained and all the rest discarded, i. e. reset to zero. (Of course in a real data block of say, for example, 150,000 pixels or more for a swath, the number of nonzero pixel values would be on the order of at least 5,500 trim data points to be retained and transmitted.)

It is important to optimization of our invention that the numbers retained be those particular numbers, preferably five percent or in our small example three numbers (for all three primary colors in the aggregate), whose absolute values are largest. We have set forth previously that the values of the residual data themselves serve as the selection criterion, for the points that are most important to keep and use—as well as serving in the role of the actual correction quantities to be applied later in the receiver.

Figure 3E:
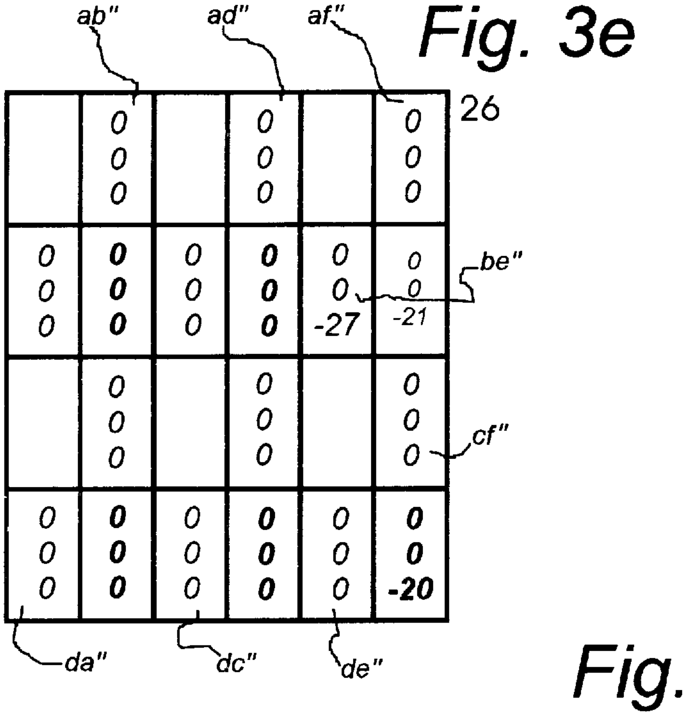
FIG. 3*e* is a trim-data array derived by applying a threshold to FIG. 3*d*.

The results of this selection appear in FIG. 3*e*: the highest absolute values are a negative twenty-seven at pixel be", negative twenty-one at bf", and negative twenty at df" respectively—all for blue. (It is only a coincidence that all three numbers are negative and in the blue plane, for the particular arbitrary data assumed.)

FIG. 3*e* thus represents the results of an adaptive, or dynamic, thresholding process. It may then be asked what the threshold itself—i. e., the value above which error values are transmitted to the printer—actually is.

A first answer to this is that the numerical threshold itself is not of particular interest, since the particular value of the threshold is applicable only to this particular numerical example—and the threshold for every other example will be at least somewhat different.

Having said this, however, we can add that the threshold value is implicit in the numbers of FIGS. 3*d* and 3*e*. It is an absolute value of nineteen (as seen for example at the unselected value for red at pixel df' in FIG. 3*d*), since the smallest absolute value selected is twenty.

More important is the adaptive threshold selection process. For the entire array, first the error having the highest absolute value is selected.

If the number of occurrences of this error equals or exceeds the selected fraction (e. g., five percent) of the total number of values (fifty-four), then the selection is complete—except that if the number of occurrences exceeds the selected fraction by a significant number, then arbitrarily the system must pick some of the occurrences to discard, so as to eliminate the excess and thereby enforce the design objectives.

If the number of occurrences selected does not equal or exceed the selected fraction, then the error having the next highest absolute value is selected The exception condition discussed in the preceding paragraph is then applied again—but with respect to the sum of occurrences of the highest two error values noted, rather than just the one highest. We iterate this process automatically until eventually the allotment is satisfied.

Since the overriding objective is to make a modest improvement in overall quality while remaining within our time allotment—in other words, while maintaining a 3:1 compression and avoiding time-consuming calculations—we are selecting the highest three values without regard to the color plane in which each value is found. As will be understood, reasoning could be presented in favor of instead allocating these values among the several color planes, as for instance in our example roughly one value for each color plane.

Such a strategy is not unreasonable, and is within the scope of our invention. Indeed it might be deemed preferable, on the basis that, e. g., making the selection across the board may neglect an error value in one color plane that is a large relative error (because the actual color number for that color in the pixel is small)—while instead selecting an error value in another color plane that is a small relative error (because the actual color number for that color is large).

This reasoning, while seductive, leads into troublesome areas: visual colorimetric effects are not necessarily proportional to relative errors, since the eye is much more sensitive to some colors than others; and the computations needed to determine which errors are really most important visually can be inordinately complex. Accordingly we prefer to rest on the overall rationale stated above—a modest improvement in quality, while maintaining simplicity and the target compression.

(As mentioned earlier, the invention is usable not only with eight-bit RGB transmissions to a printer but also with other numbers of bits, and/or with CMYK transmissions etc. We prefer RGB transmission for a product of present interest because that product at the actual printing stage utilizes a relatively quite complicated CMYK structure, actually having plural colorants for certain of the primaries—so that in effect more than four primaries are present. Accordingly, RLE transmission of trim data for this form of CMYK printer-space variables would be considerably more complicated and time consuming. The tradeoff accepted here is that the conversion from RGB to the relatively complex CMYK system must be performed by the printer rather than the host.)

Figure 3F:
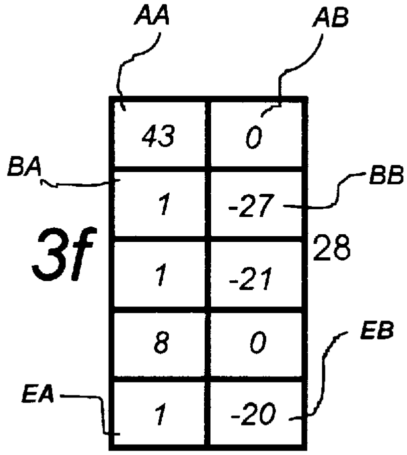
FIG. 3*f* is a representation of one version of a run-length encoded form of the FIG. 3*e* trim-data array.

It remains only to encode these data for transmission, and the results of that process appear as the RLE stream 28 of FIG. 3*f*—once again, corresponding to the like-labeled stream 28 in FIG. 3*a*. The stream consists of data pairs: each entry in column A represents the number of occurrences of a particular trim-data value in an uninterrupted sequence or "run" (ignoring the blank pixels in FIG. 3*e*); and the adjacent entry in column B represents that particular trim-data value.

The first two data pairs, rows A and B, account for all the pixels (all zeroes) in the red and green planes, plus the first eight variable pixels for blue. From FIG. 3*e* it can be seen that there are forty-three occurrences of zero in a row (again, disregarding the blanks) in this first category, and entries AA and AB in FIG. 3*f* respectively read "43" and "0".

Following in FIG. 3*e* is a single occurrence of negative twenty-seven, at pixel be". In FIG. 3*f* this is reflected at entries BA and BB, reading "1" and "–27".

Next in FIG. 3*e* come a negative twenty-one, then eight variable-pixel zeroes, and finally a negative twenty—all for blue. These are represented by the remaining data in the last four rows of FIG. 3*f*, including "1" for "–21", "8" for "0", and "1" for "–20".

The system recognizes the end of the RLE data for a particular color plane by the point at which the sum of all the column-A values cumulates to the number of pixels in the array—i. e., eighteen for each plane. It is possible, however, for a run to bridge two color planes as in the case of the forty-three zeroes mentioned above and shown in row D of FIG. 3*f*. The receiving system is trained to distribute these appropriately into the color planes involved, as well as appropriately managing the nonvariable pixels.

The example as presented here does not represent realistically the relative amounts of data to be transmitted in the RLE stream 28 and subsample 14. As can be seen in FIG. 3*f*, there are five data pairs (ten pieces of data).

For a fairer comparison with the amount of data in the original array 11 or the subsample 14, these five data pairs might be regarded as therefore the equivalent of about three data triplets. From this analysis of the small-size example it accordingly might be thought that the RLE data stream is comparable (about half) in bulk and in transmission time to the six-triplet subsample 14.

Actually, however, the RLE stream itself can be advantageously transmitted in special formats to exploit, for example, the facts that the number of bits needed to identify a "zero" is small, and "zero" is the most prevalent entry in the tabulation. Moreover a full-size sample tends to develop a far lower RLE overhead statistically. In practice the RLE stream 28 requires well under one third the transmission time of the subsample 14—sometimes even staying at five percent.

Much more realistic data appear in the histographic presentations of FIGS. 4*a* through 4*c*. These will be self explanatory to people skilled in this field.

6. A CORRESPONDING EXAMPLE OF DATA FLOW IN RECEPTION

At the printer the subsample 14 (FIG. 3*b*) is received with the RLE stream 28 (FIG. 3*f*). The subsample is interpolated 31 (FIG. 2) to produce an interpolated array 32 just like the array 16 (FIG. 3*c*).

The RLE stream 28 is decoded 33 to reconstitute a trim-data array 34 just like the outgoing trim-data array 26 (FIG. 3*e*). Now this trim-data array is applied 35 to the interpolated array, yielding a refined approximation 36 to the original data array 11. (It is at this point that the printer skips over the pixels which are in the subsample, so that the blanking of those pixels as in FIG. 3*e* does not throw the reconstruction process out of synchronization.)

Figure 3G:
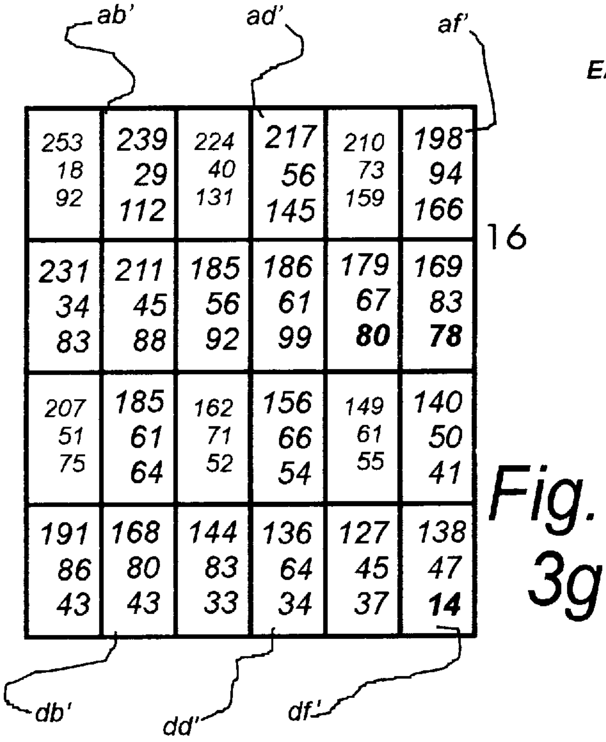
FIGS. 3 are a schematic representation of data flow within the apparatus of FIGS. 1 and 2, for an arbitrarily constructed example of a portion of an image—and in particular.

This improved approximation 36 appears in FIG. 3*g*, which represents simply addition of the arrays 16 and 26 of FIGS. 3*c* and 3*e*. It can be noted that at the pixels where nonzero entries appear in FIG. 3*e*—namely the pixels at which the interpolated array 32 was most seriously out of agreement with the original array 11 —the refined, final approximation 36 is now identically in agreement with that original.

These particular values appear in boldface type in FIG. 3*g*. They exhibit restoration of the original data at all the pixels where nonzero entries appear in FIG. 3*e*—namely the values of "80" and "78" in pixels be' and bf' respectively, and "14" in pixel df'—all for blue.

All of the remaining errors that were disregarded, by application of the threshold to the residual 24 in FIG. 3*d*, are smaller—and in the great majority of cases much smaller—than those which were corrected.

7. CONCLUSION

Our system and method, even though constrained to maintain the target compression ratio, turns out in practice for photograph-like images to satisfy the previously mentioned condition of being "visually lossless". While we do discard some data in the trim-data forming means, the selection of data to be discarded is just sufficiently cautious that the difference is not easily seen.

The above disclosure is intended as merely exemplary, and not to limit the scope of the invention—which is to be determined by reference to the appended claims.

What is claimed is:

1. In a system for transferring pixel-based image data from an image-data source into a printer, and for using said data in the printer, the combination of:

means for subsampling an entire set of image data, to form a subsample for transmission and later interpolation;

means for evaluating error that will remain upon interpolating the subsample;

means, responsive to the error-evaluating means, for forming an amount of trim data for application to the interpolated subsample to remove part of said error;

wherein the trim-data forming means control the amount of trim data to maintain an advantage in overall transmission time of the subsample and the trim data, relative to transmitting the entire image-data set; and means for transmitting, to the printer, the subsample and the trim data;

wherein the trim-data forming means further comprise means for padding out said controlled amount of trim data with zeroes to form a complete trim-data array; and further comprising means for run-length encoding the padded-out trim-data array.

2. In a system for transferring pixel-based image data from an image-data source into a printer, and for using said data in the printer, the combination of:

means for subsampling an entire set of image data, to form a subsample for transmission and later interpolations;

means for evaluating error that will remain upon interpolating the subsample;

means, responsive to the error-evaluating means, for forming an amount of trim data for application to the interpolated subsample to remove part of said error; and means for transmitting, to the printer, the subsample and the trim data; and wherein:

the trim-data forming means control the amount of trim data to maintain an advantage in overall transmission time of the subsample and the trim data, relative to transmitting the entire image-data set;

the trim-data forming means control the amount of trim data for a data block, at a substantially constant fraction of the number of points in said data block, substantially independent of the error-evaluating means; and said data block is either the entire image-data set or one of a group of defined portions thereof.

3. The combination of claim 2, particularly for use with a printer that constructs an image on a printing medium by scanning of a multielement printhead across the medium to form swaths of dots; and wherein:

each of said portions is a swath of dots; and the trim-data forming means control the amount of trim data for each swath at a substantially constant fraction of the number of points in the swath.

4. The combination of claim 3, wherein:

said fraction is roughly five percent.

5. The combination of claim 2, further comprising:

means for transmitting pure-text portions of an image separately from said subsample and said trim data.

6. The combination of claim 2, further comprising:

means for storage of automated instructions for operation of all of the foregoing means; and means for retrieval of the instructions from storage and application of the retrieved instructions to operate all of said foregoing means.

7. In a system as described in claim 2, the combination of claim 1 further comprising in the printer:

means for receiving the subsample;

means for interpolating the subsample, to form an approximation of the entire set of image data;

means for receiving the trim data;

means for applying the trim data to the interpolated subsample to remove part of said error; and means for applying the trimmed interpolated subsample to control printing of a corresponding image by the printer.

8. The combination of claim 7, further comprising in the printer:

means for storage of automated instructions for operation of all of the foregoing receiving, interpolating and applying means; and means for retrieval of the instructions from storage and application of the retrieved instructions to operate all of said foregoing receiving, interpolating and applying means.

9. The combination of claim 8, wherein:

the interpolating means interpolate bilinearly.

10. A system for receiving and using pixel-based image data from an image-data source, in a printer; said system comprising:

means for receiving a subsample of an entire set of image data;

means for interpolating the subsample, to form an approximation of the entire set of image data;

means for receiving trim data that comprise a controlled amount of trim data, padded out with zeroes to form a complete trim-data array, and run-length encoded;

means for run-length decoding the padded-out trim data;

means for applying the trim data to the interpolated subsample to remove a significant part of said error; and means for applying the trimmed interpolated subsample to control printing of a corresponding image by the printer.

11. The system of claim 10, further comprising:

means for storage of automated instructions for operation of all of said means; and means for retrieval of the instructions from storage and application of the retrieved instructions to operate all of said means.

12. The system of claim 10, wherein:

the interpolating means interpolate bilinearly.

13. A method of transferring image data into a printer, for printing of a corresponding image on a printing medium by construction from individual marks formed in pixel column-and-row arrays by a scanning multiple-nozzle pen that operates in conjunction with a printing-medium advance mechanism; said method comprising the steps of:

subsampling an entire set of the image data, to form a subsample for transmission and interpolation;

evaluating error that will remain upon interpolating the subsample;

responsive to the error-evaluating means, forming trim data for application to the interpolated subsample to remove a significant part of said error;

transmitting the subsample and the trim data from the source to the printer;

storing, in machine-readable form, automated instructions for all the foregoing steps; and retrieving and implementing the automated instructions to compress and transmit data;

wherein the subsampling step controls the amount of trim data for a data block, at a substantially constant fraction of the number of points in said data block, substantially independent of the error-evaluating step; said data block being defined as either the entire image-data set or one of a group of defined portions thereof.

14. The method of claim 13, wherein:

the trim-data forming step further comprises controlling the amount of trim data to maintain an advantage in overall transmission time of the subsample and the trim data, relative to transmitting the entire image-data set.

15. The method of claim 14, further comprising, in the printer:

receiving the subsample and the trim data;

interpolating the subsample;

applying the trim data to refine the interpolated subsample; and applying the refined interpolated subsample to control printing of the corresponding image.

* * * * *